United States Patent
Thonn et al.

(10) Patent No.: US 6,980,358 B2
(45) Date of Patent: Dec. 27, 2005

(54) TURNING PRISM FOR ULTRAVIOLET RADIATION

(75) Inventors: Tracy F. Thonn, Sunnyvale, CA (US); R. Ian Edmond, Meadow Vista, CA (US)

(73) Assignee: Coherent, Inc., Santa Clara, CA (US)

( * ) Notice: Subject to any disclaimer, the term of this patent is extended or adjusted under 35 U.S.C. 154(b) by 105 days.

(21) Appl. No.: 10/674,239

(22) Filed: Sep. 29, 2003

(65) Prior Publication Data

US 2005/0068643 A1   Mar. 31, 2005

(51) Int. Cl.[7] .......... G02B 13/14; G02B 5/30; G02B 5/04
(52) U.S. Cl. .......... 359/352; 359/355; 359/487; 359/833; 359/837; 359/900
(58) Field of Search .............. 359/487, 495, 359/496, 833, 834, 900, 350, 355, 352, 837

(56) References Cited

U.S. PATENT DOCUMENTS

| | | | |
|---|---|---|---|
| 3,402,364 A * | 9/1968 | De Lang | 372/100 |
| 4,017,153 A * | 4/1977 | Sardos | 359/487 |
| 4,525,034 A * | 6/1985 | Simmons | 359/488 |
| 4,723,841 A | 2/1988 | Roy et al. | 350/359 |
| 4,746,201 A * | 5/1988 | Gould | 359/487 |
| 4,759,616 A * | 7/1988 | Marchant | 359/669 |
| 4,929,067 A * | 5/1990 | Sander | 359/669 |
| 5,013,136 A * | 5/1991 | Whitehead et al. | 359/834 |
| 5,973,864 A * | 10/1999 | Lehmann et al. | 359/834 |
| 6,456,434 B1 * | 9/2002 | Davydov | 359/496 |

* cited by examiner

*Primary Examiner*—Ricky D. Shafer
(74) *Attorney, Agent, or Firm*—Stallman & Pollock LLP

(57) ABSTRACT

A truncated triangular prism has an entrance and an exit face perpendicular to each other and a reflecting face inclined at an angle $\alpha$ to the entrance face where $\alpha$ is about $135°-\theta_B$, and where $\theta_B$ is the external Brewster angle for the material of the prism at the wavelength of radiation to be reflected by the prism. A beam of p-polarized radiation directed into the prism through the entrance face at the Brewster angle is totally internally reflected from the reflecting face and leaves the exit face at the Brewster angle and at an angle of ninety degrees to the direction at which the radiation enters the prism.

21 Claims, 1 Drawing Sheet

TURNING PRISM FOR ULTRAVIOLET RADIATION

TECHNICAL FIELD OF THE INVENTION

The present invention relates generally to optical components for reflecting radiation incident thereon through an angle of ninety degrees. The invention relates in particular to an uncoated prism arranged to reflect ultraviolet incident radiation polarized in the plane of incidence through an angle of ninety degrees via total internal reflection from a face of the prism.

DISCUSSION OF BACKGROUND ART

In optical systems it is often required to turn a beam of radiation through an angle of ninety degrees. One common method of effecting this is to reflect the radiation using a front surface mirror having a multilayer dielectric reflective coating having alternate layers of high and low refractive index dielectric materials. This method can pose problems when radiation to be reflected is ultraviolet (UV) or deep ultraviolet (DUV) radiation, and when the radiation is plane polarized in (or parallel to) the plane of the reflection, i.e., the plane of incidence of the radiation on the mirror. Radiation polarized in this way is usually referred to as "p" polarized by practitioners of the art. For purposes of this discussion, "UV radiation" refers to radiation having a wavelength between about 200 and 400 nanometers (nm), and DUV radiation refers to radiation having a wavelength of less than about 200 nm.

The problem arises because the reflection of a dielectric multilayer having a given number of layers is less for p-polarized radiation than for unpolarized radiation, and for radiation polarized perpendicular to the incidence plane ("s" polarized). More layers are required to provide a desired reflection for p-polarized radiation than are required to provide the same reflection for unpolarized radiation or s-polarized radiation. This problem is worse for ultraviolet radiation than for visible radiation. This is because UV transmitting materials typically have a refractive index no greater than about 2.0, whereas visible and infrared transmitting materials having a refractive index of 2.35 or greater are available. The problem is even worse for DUV radiation as materials transparent to DUV radiation typically have a refractive index no greater than 1.75. There are low refractive index materials (materials having a refractive index of 1.5 or less), such as magnesium fluoride ($MgF_2$) or silicon dioxide ($SiO_2$) that transmit both UV, DUV, and visible radiation.

The relatively low maximum refractive index value of UV and DUV transmitting dielectric materials means that more layers are required to provide a given reflection value than would be required to provide the same reflection for visible radiation. By way of example, in order to provide a reflectivity of 99% for p-polarized radiation at a wavelength of 193 nanometers (nm) and at 45° incidence, about 71 layers would be necessary. Only about 15 layers would be necessary to provide the same reflectivity at 45° incidence for p-polarized radiation having a wavelength of about 525 nm.

Internal stress, electronic absorption, and defect content in a multilayer dielectric coating can increase with the number of layers in the coating. Susceptibility to radiation damage by non-propagating pit formation, for example, can increase with increasing stress, electronic absorption or the number of defects in a coating. However, any optically coated surface can usually be expected to be more susceptible to radiation damage than an uncoated surface. Accordingly, there is a need for a method for providing 90-degree reflection of p-polarized radiation, in particular for UV radiation, and more particularly for DUV radiation that does not require the use of a multilayer reflective coating, and preferably does not require any optical coating.

SUMMARY OF THE INVENTION

The present invention is directed to reflecting radiation through an angle of ninety degrees. In one aspect the invention comprises a prism of a material transparent at the wavelength of the radiation to be reflected. The prism has first, second, and third plane faces. The first and second faces are oriented perpendicular to each other and the third face is inclined at an angle $\alpha$ to the first face and at an angle $\omega$ to the second face, where $\alpha$ is about $135°-\theta_B$, $\omega$ is about $\theta_B-45°$ and where $\theta_B$ is the external Brewster angle for the material of the prism at the wavelength of the radiation.

A beam of radiation to be reflected through the 90-degree angle is directed into the prism via the first face thereof at an incidence angle $\theta_B$ to the first face in an incidence plane perpendicular to the first face. Radiation having entered the prism is reflected from the third face thereof by total internal reflection. The reflected radiation exits the prism via the second face thereof at an incidence angle $\theta_B$ to the second face and at an angle of 90 degrees to the radiation incident on the first face.

The prism and method of using the prism are most effective for radiation plane polarized in the plane of the angle through which the radiation is reflected. The prism can be fabricated from a range of materials including fused silica ($SiO_2$) and calcium fluoride ($CaF_2$), which are transparent to ultraviolet radiation wavelengths.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain the principles of the present invention.

DETAILED DESCRIPTION OF THE INVENTION

Figure 1A:
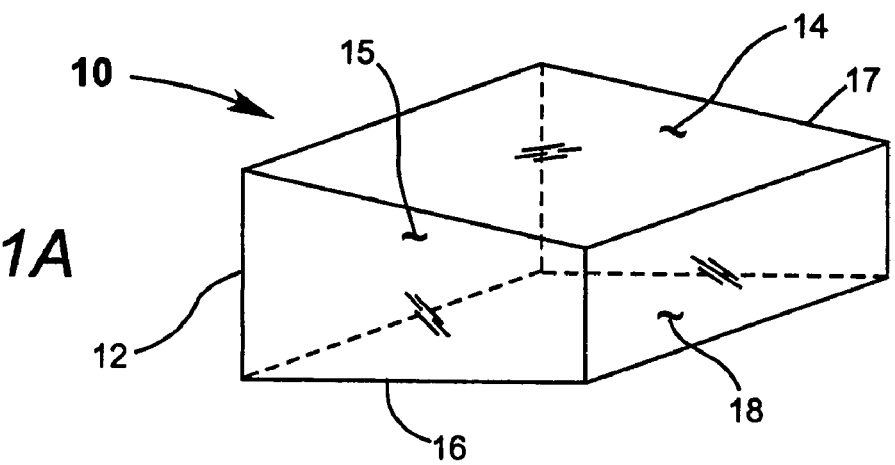
FIGS. 1A and 1B are three-dimensional views schematically illustrate a preferred embodiment a prism in accordance with the present invention seen from different viewpoints.
Figure 1B:
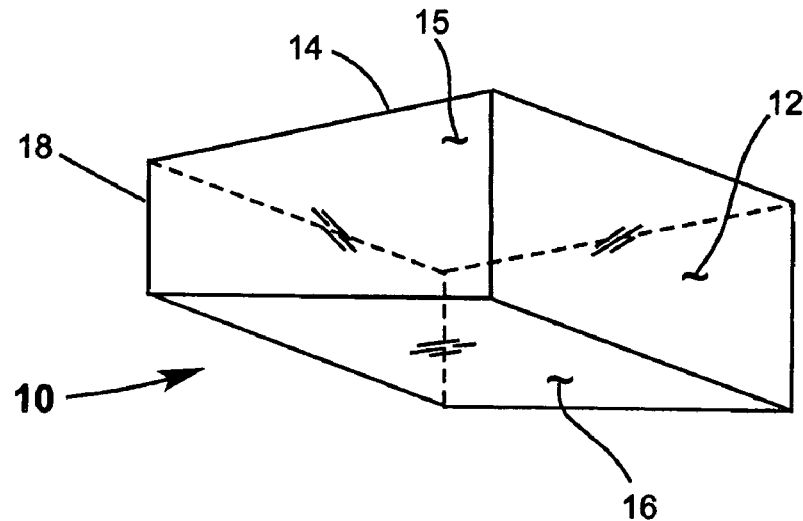
Figure 2:
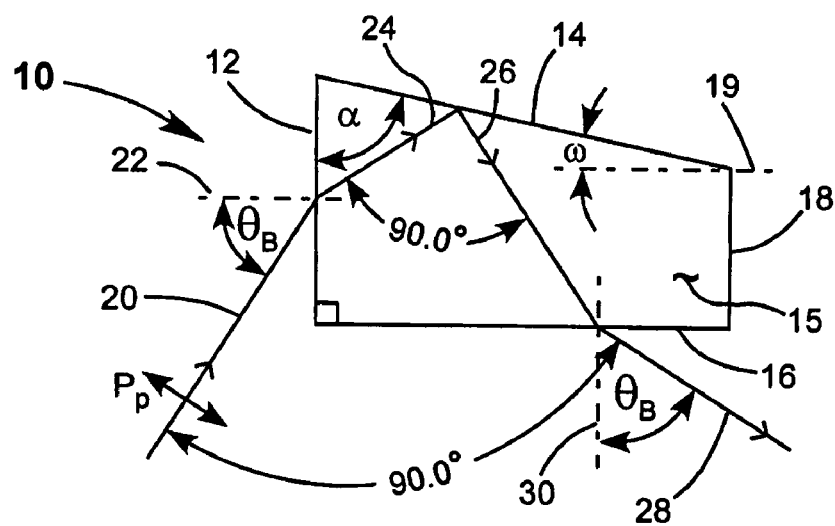
FIG. 2 is a side elevation view schematically depicting a preferred method of providing 90-degree reflection of p-polarized radiation using the prism of FIGS. 1A and 1B.

Referring now to FIG. 1A, FIG. 1B and FIG. 2, one preferred embodiment 10 of a prism in accordance with the present invention includes rectangular faces 12, 14, and 16. In the arrangement of FIG. 2, faces 12 and 16 serve as entrance and exit faces, respectively, of the prism. Face 14 serves as a reflecting face. Faces 12, 14, and 16 are optically polished. The prism may be described as a truncated triangular prism because of the shape of side-faces 15 and 17. Truncation of the prism provides a face 18 that does not have any optical function in the use of the prism. Side faces 15 and 17, and face 18 do not need to be optically polished. While prism faces are depicted as intersecting to provide sharp edges, prism edges may be beveled, as is common in the art, to reduce the possibility of edge chipping.

Referring in particular to FIG. 2, faces 12 and 16 are oriented perpendicular to each other. Reflecting face 14 is oriented at an angle α to entrance face 12, where α is about 135° minus $\theta_B$, and $\theta_B$ is the external Brewster angle for the material of prism 10. The term external Brewster angle, as used herein, means the Brewster angle in air at the air/material interface. This inclination of faces 12 and 16 provides that reflecting face 14 is inclined at an angle (ω) of about $\theta_B$ minus 45° to plane 16, as illustrated by dotted line 19 parallel to face 16.

Continuing with reference to FIG. 2, in a preferred method of use of prism 10, radiation is directed on to the prism along a path 20 at an angle of incidence $\theta_B$ to face 12. It should be noted that the angle of incidence is measured from a normal to the face indicated by dotted line 22, as is usual in the art. The plane of incidence, here, the plane of the drawing, is perpendicular to face 12. If the incident radiation is p-polarized, as indicated by double arrow $P_p$, there will be negligible loss of radiation at face 12.

Radiation enters the prism and is refracted on entering along a path 24 incident on reflecting face 14. The refraction angle at surface 12 is 90° minus $\theta_B$. Accordingly, as angle α is 135° minus $\theta_B$, the radiation will be incident on face 14 at 45°. At this incidence angle, the radiation will be reflected, with negligible loss, by total internal reflection (TIR) along a path 26 at 90° to path 24. This provides that path 26 is incident on face 16 at an angle of 90° minus $\theta_B$. Accordingly, the radiation exits prism 10, via face 16 thereof, along a path 28 at an angle $\theta_B$ to face 16, i.e., at an angle $\theta_B$ to a normal 30 to face 16. Path 28 is at 90° to path 20. One skilled in the art will recognize that prism 10 can also be used by directing radiation into the prism along path 28, in which case the radiation will leave the prism along path 20, at 90° to path 28.

As, in either direction of entry, radiation enters and leaves prism 10 at the Brewster angle $\theta_B$, and is reflected by total internal reflection, radiation plane-polarized in the turning plane defined by paths 20 and 28, i.e., p-polarized radiation, can be reflected or turned at 90° with negligible loss without the use of either multilayer reflective coatings or antireflection coatings. It should be noted that while the present invention is directed in particular to reflecting ultraviolet radiation, for reasons discussed above, the invention is equally useful for reflecting other radiation wavelengths such as visible and infrared. From the description provide herein, one skilled in the art will be able to determine appropriate prism angles α and ω for a range of wavelengths and prism materials transparent to those wavelengths.

By way of example, and to provide an indication of prism angles involved, if the wavelength of radiation to be reflected is 193 nm and prism 10 is fabricated from calcium fluoride having a refractive index of 1.5018 at that wavelength, $\theta_B$ is 56.34°, angle α is preferably 78.66° and angle ω is preferably 11.34°. If the wavelength of radiation to be reflected is 244 nm and prism 10 is fabricated from fused silica having a refractive index of 1.5110 at that wavelength, $\theta_B$ is 56.50°, angle α is preferably 78.50° and angle ω is preferably 11.50°.

The present invention is described above in terms of a preferred embodiment. The invention, however, is not limited to the embodiment described and depicted. Rather the invention is limited only by the claims appended hereto.

What is claimed is:

1. An optical component for reflecting radiation, comprising:
 a prism of a material transparent at the wavelength of the radiation to be reflected, said prism having first, second, and third plane faces; and
 wherein said first and second faces are oriented perpendicular to each other and said third face is inclined at an angle α to said first face and at an angle ω to said second face, where α is about 135°–$\theta_B$, ω is about $\theta_B$–45° and where $\theta_B$ is the external Brewster angle for the material of the prism at the wavelength of the radiation.

2. The optical component of claim 1, wherein the radiation wavelength is 193 nm, the prism material is calcium fluoride, and $\theta_B$ is about 56.34°.

3. The optical component of claim 1, wherein the radiation wavelength is 244 nm, the prism material is fused silica, and $\theta_B$ is about 56.50°.

4. The optical component of claim 1, wherein said prism is a truncated triangular prism.

5. A method of turning a beam of radiation through an angle of 90 degrees, comprising:
 providing a prism of a material transparent at the wavelength of the radiation to be reflected, said prism having first, second, and third plane faces, said first and second faces being oriented perpendicular to each other and said third face being inclined at an angle α to said first face, where α is about 135°–$\theta_B$, and where $\theta_B$ is the external Brewster angle for the material of the prism at the wavelength of the radiation; and
 directing said beam of radiation into said prism via said first face thereof at an incidence angle $\theta_B$ to said first face in an incidence plane perpendicular to said first face, whereby said radiation beam in said prism is reflected from said third face thereof by total internal reflection and exits said prism via said second face thereof at an incidence angle $\theta_B$ to said second face and at an angle of 90 degrees to said radiation incident on said first face.

6. The method of claim 5, wherein the radiation wavelength is 193 nm, the prism material is calcium fluoride, and $\theta_B$ is about 56.34°.

7. The method of claim 5, wherein the radiation wavelength is 244 nm, the prism material is fused silica, and $\theta_B$ is about 56.50°.

8. The method of claim 5, wherein the radiation is p-polarized at the first face of the prism.

9. The method of claim 5, wherein said prism is a truncated triangular prism.

10. A method of turning a beam of radiation through an angle of 90 degrees, comprising:
 providing a prism of a material transparent at the wavelength of the radiation to be reflected, said prism having first, second, and third plane faces, said first and second faces being oriented perpendicular to each other and said third face being inclined at an angle ω to said second face, where ω is about $\theta_B$–45°, and where $\theta_B$ is the external Brewster angle for the material of the prism at the wavelength of the radiation; and
 directing said beam of radiation into said prism via said second face thereof at an incidence angle $\theta_B$ to said second face in an incidence plane perpendicular to said second face, whereby said radiation beam in said prism is reflected from said third face thereof by total internal reflection and exits said prism via said first face thereof at an incidence angle $\theta_B$ to said first face and at an angle of 90 degrees to said radiation incident on said second face.

11. A method of turning a beam of radiation of a predetermined wavelength through an angle of 90 degrees using a prism comprising:
   providing a prism having an entrance face, an exit face and a reflecting face; and
   directing the beam of radiation into the entrance face at the external Brewster's angle and causing the beam to be refracted within the prism and then reflected by total internal reflection at the reflecting face and exiting the prism via the exit face at the external Brewster's angle, with the angles of the prism faces with respect to each other being selected so that the path of the beam exiting the prism is about 90 degrees offset from the path of the beam entering the prism.

12. The method of claim 11, wherein the prism is formed from calcium fluoride.

13. The method of claim 11, wherein the prism is formed from fused silica.

14. The method of claim 11, wherein the radiation is p-polarized at the entrance face of the prism.

15. The method of claim 11, wherein said prism is a truncated triangular prism.

16. The method of claim 11, wherein the entrance and exit faces are oriented perpendicular to each other.

17. An optical component for reflecting radiation, comprising:
   a prism having an entrance face, an exit face and a reflecting face and wherein said entrance and exit faces are oriented perpendicular to each other and said reflecting face is inclined at an angle $\alpha$ to said fkst entrance face and at an angle $\omega$ to said exit face, and wherein the angles $\alpha$ and $\omega$ are selected so that when a beam of radiation enters the entrance face at the external Brewster's angle, the beam will be refracted and then reflected by total internal reflection at the reflecting face and exit the prism via the exit face at the external Brewster's angle with a path that is offset by about 90 degrees from the path at which the beam enters the prism.

18. The optical component of claim 17, wherein the prism is formed from calcium fluoride.

19. The optical component of claim 17, wherein the prism is formed from fused silica.

20. The optical component of claim 17, wherein the radiation is p-polarized at the entrance face of the prism.

21. The optical component of claim 17, wherein said prism is a truncated triangular prism.

* * * * *